United States Patent
Kodama (10) Patent No.: US 9,956,543 B2
(45) Date of Patent: May 1, 2018

(54) ZIRCONIA-BASED POROUS BODY AND METHOD FOR PRODUCING SAME

(71) Applicant: DAIICHI KIGENSO KAGAKU KOGYO CO., LTD., Osaka-shi, Osaka (JP)

(72) Inventor: Hiroshi Kodama, Osaka (JP)

(73) Assignee: DAIICHI KIGENSO KAGAKU KOGYO CO., LTD., Osaka (JP)

( * ) Notice: Subject to any disclaimer, the term of this patent is extended or adjusted under 35 U.S.C. 154(b) by 0 days. days.

(21) Appl. No.: 14/913,077

(22) PCT Filed: Apr. 25, 2014

(86) PCT No.: PCT/JP2014/061661
§ 371 (c)(1),
(2) Date: Feb. 19, 2016

(87) PCT Pub. No.: WO2015/145787
PCT Pub. Date: Oct. 1, 2015

(65) Prior Publication Data
US 2016/0207027 A1    Jul. 21, 2016

(30) Foreign Application Priority Data
Mar. 28, 2014    (JP) .................................. 2014-070424

(51) Int. Cl.
*B01J 21/06* (2006.01)
*B01J 35/10* (2006.01)
(Continued)

(52) U.S. Cl.
CPC ............. *B01J 21/066* (2013.01); *B01J 23/10* (2013.01); *B01J 35/1014* (2013.01);
(Continued)

(58) Field of Classification Search
CPC ...................................................... B01J 21/066
See application file for complete search history.

(56) References Cited

U.S. PATENT DOCUMENTS 7,431,910 B2 † 10/2008 Takao
7,939,041 B2    5/2011 Darab
(Continued)

FOREIGN PATENT DOCUMENTS

JP    6-183739 A    7/1994
JP    2006-36576 A    2/2006
(Continued)

OTHER PUBLICATIONS

International Search Report dated Aug. 5, 2014, issued in counterpart Application No. PCT/JP2014/061661 (2 pages).
(Continued)

*Primary Examiner* — Melvin C. Mayes
*Assistant Examiner* — Michael Forrest
(74) *Attorney, Agent, or Firm* — Westerman, Hattori, Daniels & Adrian, LLP (57) ABSTRACT

This invention provides a zirconia-based porous body having a pore diameter suitable for supporting catalytic active species, such as precious metals, small variability in pore diameter, and a sufficient specific surface area even after 12-hour heating at 1000° C. Specifically, the invention provides a zirconia-based porous body in particle form having (1) a pore diameter peak at 20 to 100 nm in the pore distribution by BJH method, a P/W ratio of 0.05 or more wherein W represents half width of the peak and P represents height of the peak in the measured pore distribution curve, and a total pore volume of 0.5 cm$^3$/g or more; and (2) a pore diameter peak at 20 to 100 nm, the P/W ratio of 0.03 or
(Continued)

more, a specific surface area of at least 40 m²/g, and a total pore volume of 0.3 cm³/g or more, after heat treatment at 1000° C. for 12 hours.

10 Claims, 3 Drawing Sheets

(51) Int. Cl.
    *B01J 37/03* (2006.01)
    *B01J 37/08* (2006.01)
    *B01J 37/04* (2006.01)
    *B01J 37/20* (2006.01)
    *B01J 23/10* (2006.01)
    *C01G 25/02* (2006.01)

(52) U.S. Cl.
    CPC ....... *B01J 35/1038* (2013.01); *B01J 35/1042* (2013.01); *B01J 35/1061* (2013.01); *B01J 35/1066* (2013.01); *B01J 37/031* (2013.01); *B01J 37/04* (2013.01); *B01J 37/08* (2013.01); *B01J 37/20* (2013.01); *C01G 25/02* (2013.01); *C01P 2004/03* (2013.01); *C01P 2004/32* (2013.01); *C01P 2006/12* (2013.01); *C01P 2006/13* (2013.01); *C01P 2006/14* (2013.01); *C01P 2006/16* (2013.01); *C01P 2006/17* (2013.01)

(56) References Cited

U.S. PATENT DOCUMENTS

| | | | |
|---|---|---|---|
| 2006/0018822 A1* | 1/2006 | Okamoto | B01D 53/885 423/608 |
| 2006/0088463 A1 | 4/2006 | Takao et al. | |
| 2006/0245999 A1† | 11/2006 | Shen | |
| 2007/0148072 A1 | 6/2007 | Okamoto et al. | |
| 2008/0050593 A1 | 2/2008 | Okamoto | |
| 2008/0090723 A1* | 4/2008 | Okamoto | B01D 53/945 502/304 |
| 2008/0312075 A1 | 12/2008 | Okamoto | |
| 2009/0149320 A2 | 6/2009 | Okamoto | |
| 2009/0258781 A1 | 10/2009 | Maruki et al. | |
| 2010/0021364 A1 | 1/2010 | Okamoto et al. | |
| 2012/0189517 A1 | 7/2012 | Ifrah et al. | |
| 2016/0207027 A1 | 7/2016 | Kodama | |

FOREIGN PATENT DOCUMENTS

| | | |
|---|---|---|
| JP | 2007-197311 A | 8/2007 |
| JP | 2008-81392 A | 4/2008 |
| JP | 2008-150242 A | 7/2008 |
| JP | 2009-13064 A | 1/2009 |
| JP | 2009-249275 A | 10/2009 |
| JP | 2010-227931 A | 10/2010 |
| JP | 2012-533499 A | 12/2012 |

OTHER PUBLICATIONS

Relevance of Prior Art to Claims 7-9 of US2016/0207027.
G. Dercz, et al., "X-Ray and SEM Studies on Zirconia Powders"; Journal of Achievements in Materials and Manufacturing Engineering, vol. 31, issue 2, Dec. 2008 ( pp. 408-414).
Brunauer, S. et al, "Adsorption of Gases in Multimolecular Layers", Feb. 1938, vol. 60, pp. 309-319; cited in European Office Action.
Sing, K., "The Use of Nitrogen Adsorption for the Chracterisation of Porous Materials", Colloids and Surfaces A: Physicochemical and Engineering Aspects, 2001; cited in European Office Action. (7 pages).
Huang, B. et al, "Improved Calculations of Pore Size Distribution for Relatively Large, Irregular Slit-shaped Mesopore Structure", Microporous and Mesoporous Materials, 2014, pp. 112-121; cited in European Office Action.
Barrett, E. P. et al, "The Determination of Pore Volume and Area Distributions in Porous Subustances", 1951, pp. 373-380; cited in European Office Action.
Office Action dated Nov. 28, 2017, issued in counterpart European Application No. 14887437.3. (6 pages).
S.M. Flaks, et al., Interaction of Zirconium Oxychloride with Sulfuric Acid in Aqueous Solutions, Russ. J. Inorg. Chem., 1969 17 (1), 60-65, pp. 1747-1753.†
G. Dercz, et al., X-Ray and SEM Studies on Zirconia Powders, J. of Achievements in Materials and Manufacturing Eng., vol. 31, Issue, 2, pp. 408-414, Dec. 2008.†

\* cited by examiner
† cited by third party

ZIRCONIA-BASED POROUS BODY AND METHOD FOR PRODUCING SAME

TECHNICAL FIELD

The present invention relates to a zirconia-based porous body and a method for producing the zirconia-based porous body.

BACKGROUND ART

The specific surface area of zirconia used as a catalyst support is only about 100 m$^2$/g at 400° C. Zirconia having a specific surface area greater than 100 m$^2$/g is generally amorphous, which does not have a stable structure. When zirconia is used as a catalyst support, its specific surface area is reduced at a temperature higher than 400° C.; thus, it is difficult to obtain stable catalytic performance under high temperature conditions. To use it as a catalyst support, a further improvement in heat resistance (thermal stability) is required.

In addition to heat resistance for maintaining a certain specific surface area, the pore volume distribution, heat resistance of the pores, and the like, have recently been considered important. This is because when precious metals are loaded onto support particles, and when heat treatment is performed, the catalyst support particles are caused to agglutinate, and the number of pores, in particular those having a diameter of 100 nm or more, is greatly reduced while the precious metals, such as platinum, rhodium, and palladium, supported on the surface of the catalyst support particles are embedded inside the particles, and prevented from effectively contributing to the reaction on the surface.

Specifically, precious metals, which are active species as catalysts, are supported with sufficient dispersibility in pores having a diameter of 10 to 100 nm; therefore, it is preferable that the volume of pores having a diameter of 10 to 100 nm be large, and that the volume of pores having a diameter of more than 100 nm be small. It is more preferable that the pores having a diameter of 10 to 100 nm have sufficient heat resistance against high temperatures, so that the large volume of pores having a diameter of 10 to 100 nm are maintained at a temperature as high as 1,000° C. or higher.

Patent Document 1 discloses a catalyst support material having excellent heat resistance. By controlling the particles to have a desired optimum size, this catalyst support material maintains its high specific surface area even when used under a high-temperature atmosphere for a long period of time. The Example of Patent Document 1 discloses, as sample 6, a catalyst support material having a specific surface area of 64.5384 m$^2$/g before heating and 36.7262 m$^2$/g after heating at 1000° C. for 5 hours. However, the heat resistance to maintain a certain specific surface area of this catalyst support material, when converted into the ratio of the specific surface areas of the catalyst support material before and after heating, is only:

$(A/B) \times 100 = 56.9(\%)$.

A: specific surface area after heating
B: Specific surface area before heating

Patent Document 2 discloses a zirconia-based porous material having a specific surface area of at least 30 m$^2$/g after heating at 1000° C. for 3 hours. Patent Document 2 further discloses a zirconia-based porous material having a pore diameter peak at 20 to 110 nm in pore diameter distribution by the BJH method, a total pore volume of 0.4 cm$^3$/g or more, and a specific surface area of at least 30 m$^2$/g after heating at 1000° C. for 3 hours.

Patent Document 3 discloses a porous zirconia-based powder having a total pore volume of at least 0.75 mL/g after heat treatment at 1,000° C. for 3 hours. In this porous zirconia-based powder, the total volume of pores having a diameter of 10 to 100 nm after heat treatment at 1,000° C. for 3 hours is at least 30% of the total pore volume. Patent Document 3 also discloses a porous zirconia-based powder having a specific surface area of at least 35 m$^2$/g after heat treatment at 1,000° C. for 3 hours and at least 10 m$^2$/g after heat treatment at 1,100° C. for 3 hours.

Patent Document 4 discloses a zirconium-based composite oxide having a total pore volume of at least 0.35 mL/g after heat treatment at 1,000° C. for 3 hours. In this zirconium-based composite oxide, the pore volume of pores having a diameter of 10 to 100 nm is 0.2 mL/g or more, and the pore volume of pores having a diameter of 100 nm to 10 μm is 0.2 mL/g or less.

As shown in Patent Documents 1 to 4, development is being actively pursued to improve the functions of catalyst support by increasing the pore volume and improving heat resistance to maintain a certain specific surface area. However, all of these cases are evaluated following a short-time heat treatment, and it is not believed that sufficient heat resistance is obtained. Given the above, a catalyst support having more excellent heat resistance has been in demand.

Patent Document 5 discloses an exhaust gas purification catalyst comprising a complex composed of a precious metal and cerium oxide. At least a part of the complex is coated with lanthanum-containing alumina. In this exhaust gas purification catalyst, the pore volume of pores having a diameter of 160 nm or more and less than 1,000 nm is 5% or more and 20% or less of the total pore volume. According to Patent Document 5, the pore volume distribution within the above range prevents performance deterioration caused by high-temperature endurance treatment, and allows exhaust gas to efficiently reach the precious metal, making it possible to more efficiently purify the exhaust gas even after high-temperature endurance. However, the heat resistance is not considered to be sufficient because the pore volume of pores having a diameter of 160 nm or more and less than 1,000 nm is as small as about 20% or less of the total pore volume, and also because the pore volume greatly varies.

CITATION LIST

Patent Documents

Patent Document 1: JP2008-150242A
Patent Document 2: JP2006-036576A
Patent Document 3: JP2008-081392A
Patent Document 4: JP2009-249275A
Patent Document 5: JP2010-227931A

SUMMARY OF INVENTION

Technical Problem

The present invention has been made in view of the above problems. An object of the present invention is to provide a zirconia-based porous body having a pore diameter suitable for supporting catalytic active species, such as precious metals, and having small variability in the pore diameter, as well as a sufficient specific surface area even after heat treatment at 1000° C. for 12 hours.

Solution to Problem

In view of the above problems, the present inventors conducted extensive research, and found that a zirconia-based porous body obtained by a specific production method using a zirconium salt solution and a solution of sulfatizing agent as starting materials would achieve the above object. The present invention has thereby been completed.

More specifically, the present invention relates to the following zirconia-based porous body and method for producing the zirconia-based porous body.

1. A zirconia-based porous body in the form of particles,
   (1) the zirconia-based porous body having a pore diameter peak at 20 to 100 nm in the pore diameter distribution by BJH method, a P/W ratio of 0.05 or more wherein W represents half width of the peak and P represents height of the peak in the measured pore distribution curve, and a total pore volume of 0.5 cm$^3$/g or more; and
   (2) the zirconia-based porous body having a pore diameter peak at 20 to 100 nm, the P/W ratio of 0.03 or more, a specific surface area of at least 40 m$^2$/g, and a total pore volume of 0.3 cm$^3$/g or more, after heat treatment at 1000° C. for 12 hours.

2. The zirconia-based porous body according to Item 1, wherein the zirconia-based porous body has a specific surface area of at least 20 m$^2$/g after heat treatment at 1100° C. for 12 hours.

3. The zirconia-based porous body according to Item 1 or 2, wherein each of the particles is spherical or approximately spherical as identified in an SEM image, and has a circularity coefficient of 0.85 to 1.0.

4. The zirconia-based porous body according to any one of Items 1 to 3, wherein a cross-section of the particles identified in an SEM image has a variation coefficient of the number of pores per unit area (1 μm$^2$) of 10% or less.

5. A method for producing the zirconia-based porous body of any one of Items 1 to 4, the method sequentially comprising the following steps:
   (1) separately heating a zirconium salt solution and a solution of sulfatizing agent to 95° C. or higher;
   (2) mixing the zirconium salt solution after heating and the solution of sulfatizing agent after heating to obtain a basic zirconium sulfate-containing reaction liquid as a liquid mixture, wherein, from initiation to completion of the mixing, the weight ratio of SO$_4^{2-}$/ZrO$_2$ in the liquid mixture is maintained within a range of 0.3 to 0.8, and the temperature of the liquid mixture is maintained at 95° C. or higher;
   (3) aging the basic zirconium sulfate-containing reaction liquid obtained by completing the mixing in step 2, the aging being performed at 95° C. or higher for 3 hours or more;
   (4) adding an alkali to the basic zirconium sulfate-containing reaction liquid obtained after aging in step 3 to obtain a zirconium-containing hydroxide; and
   (5) subjecting the zirconium-containing hydroxide obtained in step 4 to heat treatment to obtain a zirconia-based porous body.

6. The zirconia-based porous body production method according to Item 5, the method comprising adding a salt of at least one metal selected from the group consisting of rare earth elements, transition metal elements other than rare earth elements, alkali earth metal elements, Al, In, Si, Sn, and Bi, in any one of steps 1 to 4.

Advantageous Effects of Invention

The zirconia-based porous body of the present invention has a pore diameter peak at 20 to 100 nm in the pore diameter distribution by the BJH method, a P/W ratio of 0.05 or more wherein W represents the half width of the peak and P represents the height of the peak in the measured pore distribution curve, and a total pore volume of 0.5 cm$^3$/g or more. In this manner, the zirconia-based porous body of the present invention provides an efficient catalytic effect. In particular, the zirconia-based porous body of the present invention after heat treatment at 1000° C. for 12 hours has a pore diameter peak at 20 to 100 nm, the P/W ratio of 0.03 or more, a specific surface area of at least 40 m$^2$/g, and a total pore volume of 0.3 cm$^3$/g or more. Accordingly, the zirconia-based porous body of the present invention has excellent heat resistance to maintain a high specific surface area even after heating for a long period of time.

In the method for producing the zirconia-based porous body of the present invention, when, in particular, starting materials, i.e., a zirconium salt solution and a solution of sulfatizing agent, are mixed, the temperature of the liquid mixture and the weight ratio of SO$_4^{2-}$/ZrO$_2$ in the liquid mixture are controlled to be within predetermined ranges. This enables the formation of uniform particles of basic zirconium sulfate during the production process. It is thereby possible to obtain the zirconia-based porous body of the present invention having a desired pore diameter distribution and the above characteristics.

DESCRIPTION OF EMBODIMENTS

The following describes in detail the zirconia-based porous body of the present invention and the method for producing the zirconia-based porous body of the present invention.

The following describes embodiments of the present invention in detail. However, the scope of the present invention is not limited to these embodiments. The non-Patent Documents and Patent Documents disclosed in this specification are entirely incorporated herein by reference. In this specification, the expression "A to B" indicates "A or more and B or less." For example, in this specification, the expression "0.5 to 30 wt %" indicates "0.5 wt % or more and 30 wt % or less." Further, in this specification, "and/or" indicates either one of them or both of them. The properties stated in this specification are represented by values measured by methods described in the Examples below, unless otherwise defined. In this specification, "%" indicates "wt %=mass %," unless otherwise defined.

Zirconia-Based Porous Body of the Present Invention (1) Pore Diameter Distribution The features of the zirconia-based porous body in the form of particles of the present invention lie in that (1) it has a pore diameter peak at 20 to 100 nm in the pore diameter distribution by the BJH method, a P/W ratio of 0.05 or more wherein W represents the half width of the peak and P represents the height of the peak (peak intensity) in the measured pore distribution curve, and a total pore volume of 0.5 cm$^3$/g or more, and that (2) it has a pore diameter peak at 20 to 100 nm, the P/W ratio of 0.03 or more, a specific surface area of at least 40 m$^2$/g, and a total pore volume of 0.3 cm$^3$/g or more, after heat treatment at 1000° C. for 12 hours.

The BJH method as used herein is a method for calculating mesopore size distribution, proposed by Barrett, Joyner, and Halenda. This method is the most effective model for calculating mesopore distribution. The method assumes that each pore is in a cylindrical shape. (E. P. Barrett, L. G. Joyner, and P. P. Halenda, J. Am. Chem. Soc., 73, 373 (1951))

The zirconia-based porous body of the present invention has a pore diameter peak in the pore diameter distribution within a range of 20 to 100 nm, preferably within a range of 30 to 90 nm, and more preferably within a range of 40 to 80 nm.

Figure 6:
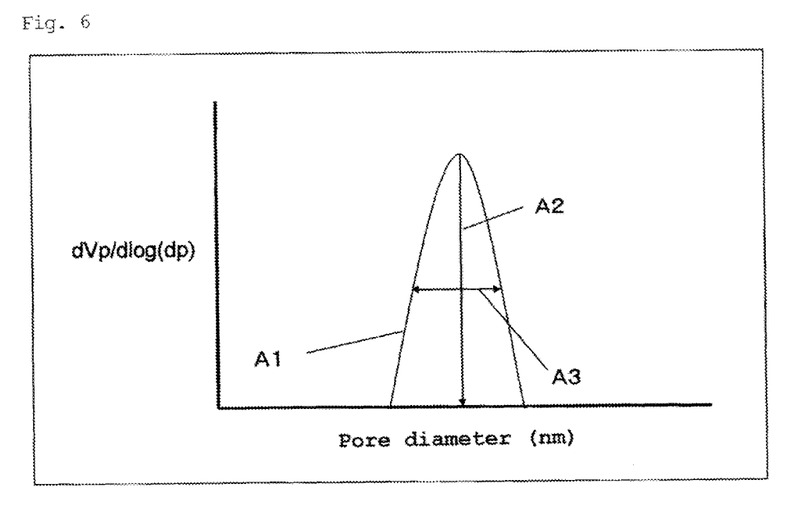
FIG. 6 is a graph showing the relationship between the peak height P and the half width W in the pore diameter distribution curve.

Further, the zirconia-based porous body of the present invention has a P/W ratio of 0.05 or more, preferably 0.07 or more, and more preferably 0.1 or more, wherein P represents the height of the peak and W represents the half width of the peak. FIG. 6 shows the relationship between the peak height P and the half width W in the pore diameter distribution curve.

The total pore volume is 0.5 cm$^3$/g or more, and preferably 0.7 cm$^3$/g or more.

The zirconia-based porous body of the present invention suffers from the following problems if it satisfies one or more of: a pore diameter peak of less than 20 nm or over 100 nm; the P/W ratio (peak height P/half width W) of less than 0.05; and a total pore volume of less than 0.5 cm$^3$/g.

Specifically, the pores become uneven, and when supporting catalytic active species, such as precious metals, the pore volume and pore diameter that help to provide catalytic ability cannot be maintained, and the catalytic active species are caused to agglutinate on the porous body surface. To obtain the desired catalytic activity, therefore, a catalytic active species in an amount more than necessary would be required, tending to increase the cost of the catalyst.

After heat treatment at 1000° C. for 12 hours, the zirconia-based porous body of the present invention has a pore diameter peak at 20 to 100 nm, preferably 30 to 90 nm, and more preferably 40 to 80 nm. The P/W ratio after the heat treatment is 0.03 or more, preferably 0.05 or more, and more preferably 0.07 or more. The specific surface area after the heat treatment is at least 40 m$^2$/g, preferably 45 m$^2$/g or more, and more preferably 50 m$^2$/g or more. Further, the total pore volume after the heat treatment is 0.3 cm$^3$/g or more, and preferably 0.5 cm$^3$/g or more. Separately from the above heat treatment and after heat treatment at 1100° C. for 12 hours, the zirconia-based porous body of the present invention preferably has a specific surface area of at least 20 m$^2$/g.

Accordingly, even after heat treatment at 1000° C. for 12 hours, the pore diameter distribution of the zirconia-based porous body of the present invention undergoes almost no change, and the high specific surface area and high total pore volume are maintained. Even after heat treatment at 1100° C. for 12 hours, it is possible to maintain a satisfactory specific surface area. In other words, the zirconia-based porous body of the present invention has excellent heat resistance, and is thus used, for example, as a promoter or a support of automotive catalysts for purifying exhaust gas, which is a high-temperature gas.

(2) Shape

The particles of the zirconia-based porous body of the present invention are spherical or approximately spherical as identified in an SEM image, and have a circularity coefficient of 0.85 to 1.0. SEM images are taken with a scanning electron microscope.

The spherical or approximately spherical shape of the particles of the zirconia-based porous body of the present invention refers to a shape having no convex portion with acute angles when the particle surface is observed. When the particles are in a spherical or approximately spherical shape, the contact area between adjacent particles is very small, and the friction between particles is reduced to the minimum. When the friction between particles is reduced, the load on the particles decreases, the formation of particle agglomerations is minimized, and additionally, the particles are not easily broken even though they have pores. Accordingly, the particle diameter and the particle shape are easily maintained.

More specifically, the particle diameter and the particle shape of the zirconia-based porous body of the present invention are easily maintained when used as a catalyst promoter or support in a catalyst device production process (including heat treatment). The ability to maintain the particle diameter and particle shape is assumed to greatly contribute to effectively achieving the catalytic ability of a catalyst device.

The zirconia-based porous body of the present invention has a circularity coefficient of 0.85 to 1.0, and preferably 0.87 to 0.95. When the zirconia-based porous body has a circularity coefficient of less than 0.85, the particles of the zirconia-based porous body have convex portions on their surface, and friction occurs between particles during a catalyst device production process. As a result, the convex portions are cut off, forming fine particles. The fine particles accelerate the agglomeration of the zirconia-based porous body with the heat generated from the engine, which causes a reduction in the specific surface area, resulting in a great decrease in the catalytic ability of the catalyst device.

(3) Internal Structure of Particles

A cross-section of the particles of the zirconia-based porous body of the present invention identified in an SEM image has a variation coefficient of the number of pores per unit area (1 μm$^2$) of 10% or less. The variation coefficient is sufficient if it is 10% or less, and is preferably 5.0 to 9.0%.

The variation coefficient is obtained by dividing the standard deviation of the number of pores per unit area (1 μm$^2$) by the average value of the number of pores, multiplied by 100, and expressed in percent. Specifically, the variation coefficient is obtained by:

Variation coefficient (%)=(standard deviation/average value)×100.

Figure 1:
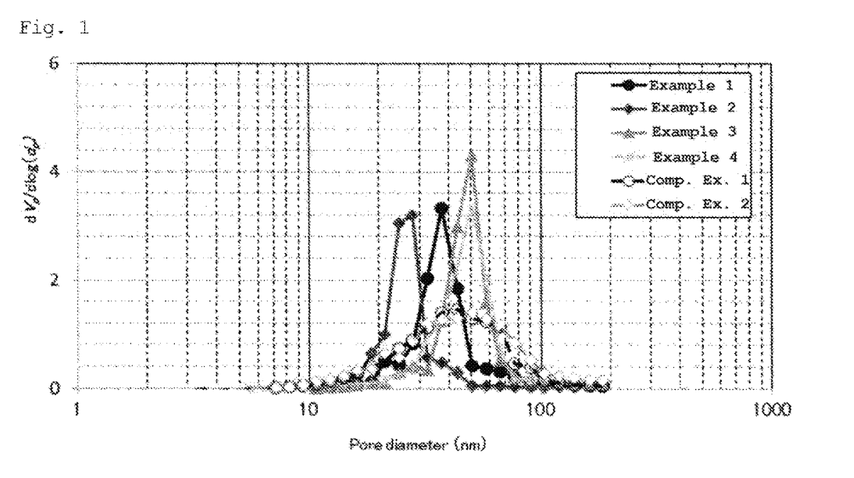
FIG. 1 is a graph showing the pore diameter distribution of the zirconia-based porous bodies before heating obtained in Examples 1 to 4 and Comparative Examples 1 and 2.
Figure 2:
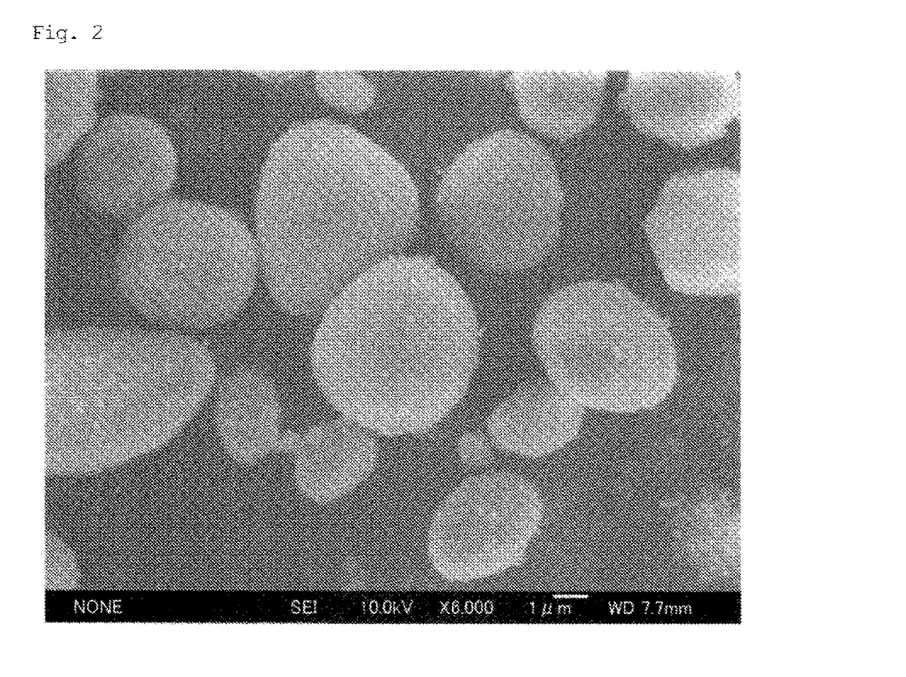
FIG. 2 is an SEM image of the particle surfaces of the zirconia-based porous body obtained in Example 1.
Figure 3:
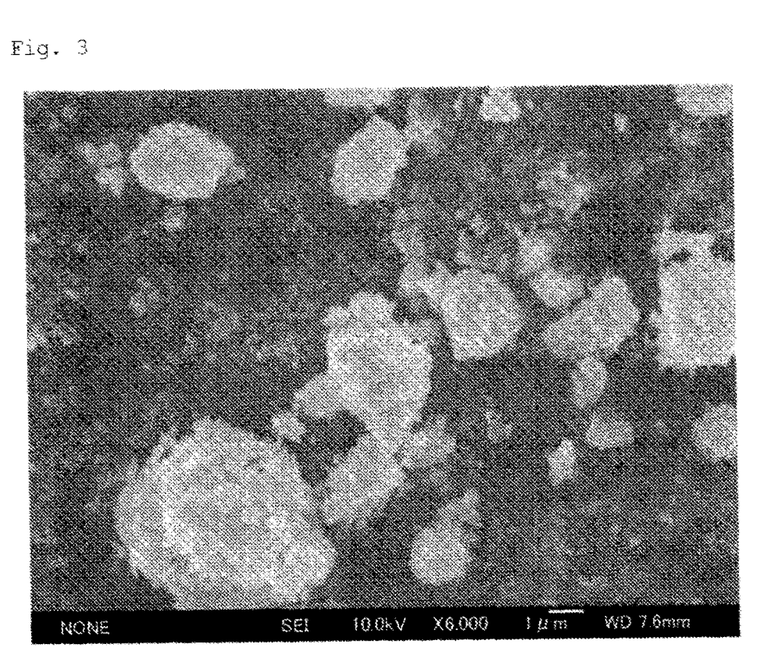
FIG. 3 is an SEM image of the particle surfaces of the zirconia-based porous body obtained in Comparative Example 1.
Figure 4:
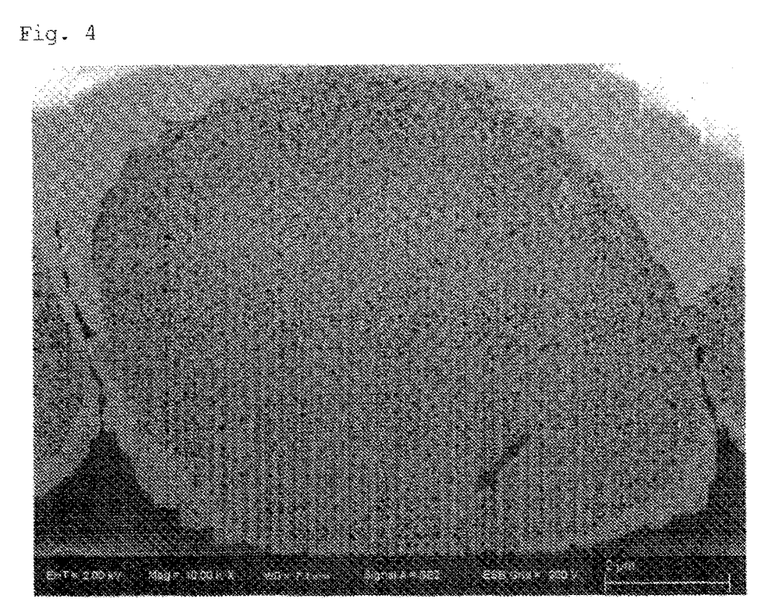
FIG. 4 is an SEM image of a cross-sectional view of the zirconia-based porous body obtained in Example 1. The arrow in the image indicates an example of a pore.
Figure 5:
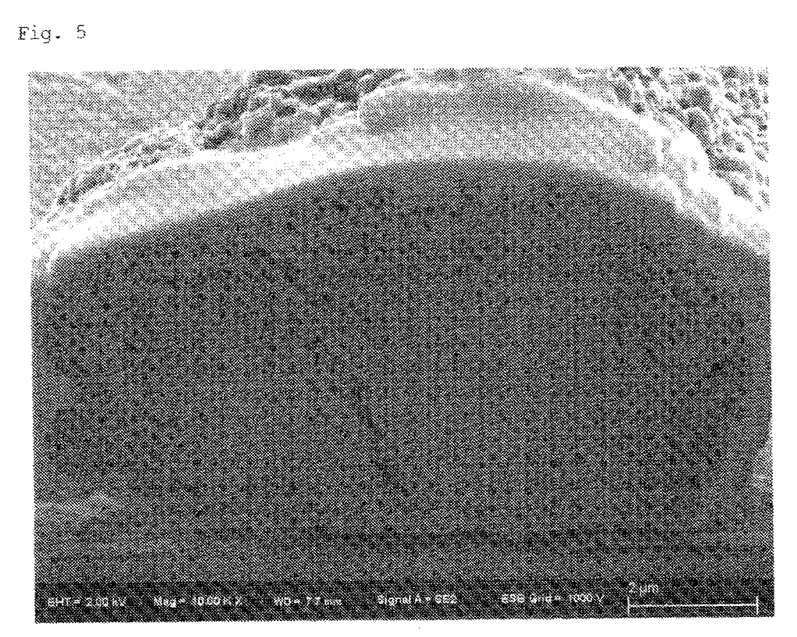
FIG. 5 is an SEM image of a cross-sectional view of the zirconia-based porous body obtained in Comparative Example 1.

A pore is the portion exemplified with an arrow in FIG. 4. The number of pores represents the number per unit area (1 μm$^2$) of an SEM image. When the variation coefficient of the number of pores is 10% or less, the pores in a particle are regularly positioned within the entire particle; thus, even when pressure is externally applied, the force is dispersed within the entire particle. In this manner, the positioning of the pores in particles and the particle shape are maintained, and even when the particles are used as a catalyst promoter or support in a catalyst device production process, the particles are unlikely to lose their shape.

If the variation coefficient of the number of pores exceeds 10%, the pores are disproportionately positioned within the particles of the zirconia-based porous body. Specifically, when force is externally applied, the balance of stress within the particles of the zirconia-based porous body is disrupted, making it difficult to maintain the particle shape.

The zirconia-based porous body of the present invention is basically composed of zirconium oxide ($ZrO_2$). To improve the heat resistance and catalyst performance, the zirconia-based porous body of the present invention may further optionally contain a third component (at least one metal selected from the group consisting of rare earth elements, transition metal elements other than rare earth elements, alkali earth metal elements, Al, In, Si, Sn, and Bi).

When the third component is contained, the zirconia-based porous body is in the form of a solid solution or a composite oxide. The amount of the third component contained in the zirconia-based porous body is not limited, and is generally less than 50 wt %, and particularly 0.1 to 49 wt %, on the oxide basis. The zirconia-based porous body may further contain inevitable impurities and the like, as long as they do not impair the effects of the present invention.

Method for Producing the Zirconia-Based Porous Body of the Present Invention

The method for producing the zirconia-based porous body of the present invention sequentially comprises the following steps:

(1) separately heating a zirconium salt solution and a solution of sulfatizing agent to 95° C. or higher;

(2) mixing the zirconium salt solution after heating and the solution of sulfatizing agent after heating to obtain a basic zirconium sulfate-containing reaction liquid as a liquid mixture, wherein, from initiation to completion of the mixing, the weight ratio of $SO_4^{2-}/ZrO_2$ in the liquid mixture is maintained within a range of 0.3 to 0.8, and the temperature of the liquid mixture is maintained at 95° C. or higher;

(3) aging the basic zirconium sulfate-containing reaction liquid obtained by completing the mixing in step 2, the aging being performed at 95° C. or higher for 3 hours or more;

(4) adding an alkali to the basic zirconium sulfate-containing reaction liquid obtained after aging in step 3 to obtain a zirconium-containing hydroxide; and (5) subjecting the zirconium-containing hydroxide obtained in step 4 to a heat treatment to obtain a zirconia-based porous body.

The following describes each step in detail.

(1) Step 1

In step 1, a zirconium salt solution and a solution of sulfatizing agent used as starting materials are separately heated to 95° C. or higher.

The zirconium salts used in the present invention are not limited as long as they supply zirconium ions. Examples of the zirconium salts include zirconium oxynitrate, zirconium oxychloride, zirconium nitrate, and the like. These may be used singly or in a combination of two or more. Of these, the use of zirconium oxychloride is preferable, considering its excellent productivity for industrial scale production.

The solvent may be suitably selected according to the type, etc., of zirconium salt used. Among various solvents, water (e.g., purified water and ion-exchanged water; this is also applicable in the description below) is generally desirable.

The concentration of the zirconium salt solution is not particularly limited. In general, the zirconium salt is preferably used in an amount of 5 to 250 g, and particularly desirably 20 to 150 g, on the zirconium oxide ($ZrO_2$) basis, per 1000 g of solvent.

The sulfatizing agent is not limited as long as it reacts with zirconium ions to form a sulfate (i.e., as long as it can vitriolize zirconium). Examples of the sulfatizing agent include sodium sulfate, potassium sulfate, ammonium sulfate, potassium hydrogen sulfate, sodium hydrogen sulfate, potassium disulfate, sodium disulfate, sulfur trioxide, a solution of sulfur trioxide in sulfuric acid (oleum), chlorosulfonic acid, sulfamic acid, sulfuryl chloride, and the like. The sulfatizing agent may be in any form, such as a powder or a solution. In the production method of the present invention, a sulfatizing agent in solution form is used. The solvent is as described above.

The zirconium salt solution used in the present invention preferably has a free acid concentration of 0.1 to 2.0 N. When the free acid concentration is within this range, the agglomeration of the particles constituting the zirconia-based porous body can be controlled to be in an appropriate state. The free acid concentration may be adjusted by using, for example, hydrochloric acid, nitrate, and sodium hydroxide.

The concentration of the sulfatizing agent is not particularly limited; the sulfatizing agent is generally used in an amount of 5 to 250 g, and particularly desirably 20 to 150 g, per 1000 g of solvent.

The material of containers in which the zirconium salt solution or the solution of sulfatizing agent is prepared is not particularly limited, as long as they have a sufficient volume so that the zirconium salt solution or the solution of sulfatizing agent can be stirred therein. It is preferable that each container have a device for appropriately heating the solutions so that the temperature of the solutions does not fall below 95° C.

It is sufficient if the zirconium salt solution and the solution of sulfatizing agent are heated to 95° C. or higher, and preferably 97° C. or higher. If the solution temperature is less than 95° C., the zirconium salt solution will not sufficiently react with the sulfatizing agent in step 2 (the mixing step), causing a reduction in yield.

(2) Step 2

In step 2, the zirconium salt solution after heating and the solution of sulfatizing agent after heating are mixed to obtain a basic zirconium sulfate-containing reaction liquid as a liquid mixture. From the initiation to the completion of the mixing, the weight ratio of $SO_4^{2-}/ZrO_2$ in the liquid mixture is maintained within a range of 0.3 to 0.8, and the temperature of the liquid mixture is maintained at 95° C. or higher.

In step 2, it is sufficient if the weight ratio $SO_4^{2-}/ZrO_2$ in the liquid mixture is 0.3 to 0.8, and is preferably 0.4 to 0.7. If the weight ratio $SO_4^{2-}/ZrO_2$ in the liquid mixture is less than 0.3, the degree of basic zirconium sulfate formation in the reaction product would be affected, causing a reduction in yield. If the weight ratio $SO_4^{2-}/ZrO_2$ in the liquid mixture exceeds 0.8, soluble salts of zirconium sulfate would be produced, which would greatly decrease the yield of basic zirconium sulfate, resulting in a great decrease in the thermal stability of the final product, i.e., the zirconia-based porous body.

In step 2, to maintain the temperature of the liquid mixture at 95° C. or higher, the temperatures of the pipes through which each solution is supplied and the container in which the liquid mixture is obtained are preferably maintained at 95° C. or higher using a heater.

(3) Step 3

In step 3, the basic zirconium sulfate-containing reaction liquid obtained by completing the mixing in step 2 is aged at 95° C. or higher for 3 hours or more; the upper limit of the aging time is not limited, and is about 7 hours.

The temperature of the liquid mixture in step 3 (the aging temperature) is 95° C. or higher, and preferably 97° C. or higher. If the aging temperature is less than 95° C., or if the aging time is less than 3 hours, basic zirconium sulfate would not be sufficiently produced, having an adverse effect on the yield.

(4) Step 4

In step 4, an alkali is added to the basic zirconium sulfate-containing reaction liquid obtained after aging in step 3 to perform neutralization. The neutralization produces zirconium-containing hydroxide.

Preferable examples of the alkali used in the present invention include sodium hydroxide, sodium carbonate, ammonia, hydrazine, ammonium bicarbonate, and the like. The concentration of alkali is not particularly limited. The alkali diluted with water to a concentration of 5 to 30% is generally used.

To add an alkali, either of the following two methods may be used with no particular limitation:
(1) adding an alkali solution to the basic zirconium sulfate-containing reaction liquid; or
(2) adding a basic zirconium sulfate-containing reaction liquid to an alkali solution.

After neutralization, the slurry is filtrated to obtain a zirconium-containing hydroxide. The obtained zirconium-containing hydroxide is preferably washed with purified water or the like, if necessary, to remove impurities. After washing, drying or the like may be performed, if necessary.

(5) Step 5

In step 5, the zirconium-containing hydroxide obtained in step 4 is subjected to heat treatment to oxidize the zirconium-containing hydroxide to thereby obtain a zirconia-based porous body.

The temperature of the heat treatment of the zirconium-containing hydroxide is not particularly limited. The heat treatment is generally performed at about 400 to 1050° C. for 1 to hours. A temperature of lower than 400° C. is not preferable because crystallization does not sufficiently occur. A temperature exceeding 1050° C. is not preferable because the obtained zirconia-based porous body initially has a low specific surface area. The heat-treating atmosphere is not particularly limited. The heat treatment is generally performed in air or in an oxidizing atmosphere.

(6) Step for Adding Rare Earth and the Like

The production method of the present invention optionally comprises adding a salt (metal salt) of at least one metal selected from the group consisting of rare earth elements, transition metal elements other than rare earth elements, alkali earth metal elements, Al, In, Si, Sn, and Bi, in any one of steps 1 to 4. The addition of these metal salts further improves the heat resistance and catalyst performance of the zirconia-based porous body.

The metal salt addition may be performed in any of steps 1 to 4. The number of additions is not particularly limited. The addition may be performed all at once or in two or more portions.

Examples of the rare earth elements include Ce, Y, Sc, La, Pr, Nd, and the like, with Ce, La, Pr, Nd, and Y being preferable.

Examples of the transition metal elements include Ti, Cr, Mn, Fe, Co, Ni, Cu, Mo, W, and the like.

Examples of the alkaline earth metals include Mg, Ca, Sr, Ba, and the like.

These metal salts are not limited as long as they are water-soluble. Examples of the metal salts include nitrate, sulfate, carbonate, acetate, chloride, bromide, and the like. To avoid the introduction of impurities, nitrate is preferable. These metal salts are mixed in a predetermined proportion. The metal salt concentration (including insoluble basic zirconium sulfate) in the liquid mixture is 0.1 to 20%, and preferably 2 to 8%, on the oxide basis. A concentration of less than 0.1% is not preferable as it is too low to achieve the effects of the addition while a concentration exceeding 20% is not preferable as it reduces the zirconium content and decreases the heat resistance.

EXAMPLES

The present invention is not limited to the embodiments described above, and various modifications and changes may be made within the scope of the invention set forth in the claims. Embodiments obtained by combining the technical means disclosed in different embodiments are also encompassed in the technical scope of the present invention. The zirconia-based porous body obtained in each Example and each Comparative Example contains hafnium oxide in an amount of 1 to 2 wt % as an inevitable impurity based on the amount of zirconium oxide.

In the Examples and Comparative Examples, the properties are measured as follows.

(1) Specific Surface Area

Specific surface area was measured according to the BET method using a specific surface area measuring instrument (FlowSorb II, produced by Micromeritics Corp.). Based on the measurement results, P/W ratios were obtained (see FIG. 6).

(2) Pore Diameter Distribution and Total Pore Volume

The pore diameter distribution and total pore volume were measured according to the BET method using a measuring device (Autosorb-1, produced by Quantachrome, Model No.: ASIKR).

(3) Oxygen Storage Capacity (OSC)

The oxygen storage capacity was measured according to an oxygen-pulse method at 600° C. using a measuring device (Multi-Task TPD (TPD-1-AT), produced by BEL Japan, Inc.).

(4) Primary Particle Size

The primary particle size was measured based on the half width of an X-ray diffraction peak using the following equation of Scherrer.

$$D = k\lambda/(\beta \cos \theta)$$

(In the equation, k: constant 0.9; $\lambda$: X-ray wavelength (Å); $\beta$: diffraction-line width of sample–diffraction line width of standard sample (radian); and $\theta$: diffraction angle (degree).)

(5) Circularity Coefficient

The circularity coefficient is a coefficient representing the degree of unevenness of particles, and is a value calculated using the equation:

$$(4\pi \times \text{area})/(\text{circumferential length})^2.$$

The circularity coefficient satisfies:

$$0 < \text{circularity coefficient} \leq 1.$$

The circularity coefficient of a perfect circle is 1. The circularity coefficient of an elliptical particle or a particle in an irregular shape is <1. The circularity coefficient was analyzed using particle analysis software Mac-View (Mountech Co., Ltd., Japan). SEM images were taken with FE-SEM; JSM-6700F (produced by JEOL Ltd.).

(6) Number of Pores Per Unit Area (1 $\mu m^2$)

A portion showing pores of a relatively similar size was selected from the view observed under a scanning electron microscope, and its image was taken at a magnification most suitable for photographing a cross-section of particles. The obtained SEM image was divided into 1-$\mu m^2$ regions, and the number of pores in each region was visually counted. Based on these numbers of pores, the average value of the number of pores and standard deviation were calculated to obtain a variation coefficient. The variation coefficient may be calculated using the following equation.

Variation Coefficient=(standard deviation/average value of number of pores)×100

Example 1

213 g of a 25% aqueous sodium sulfate solution and 450 g of an aqueous zirconium oxychloride solution ($ZrO_2$ basis: 16%) were separately heated to 95° C. Thereafter, the heated aqueous solutions were brought into contact and mixed with each other for a period of 3 hours in such a manner as to maintain the weight ratio of $SO_4^{2-}/ZrO_2$ in the liquid mixture at 0.50, thereby obtaining a basic zirconium sulfate-containing reaction liquid. The obtained basic zirconium sulfate-containing reaction liquid was kept at 95° C. for 4 hours for aging to thereby obtain a basic zirconium sulfate.

Subsequently, the aged basic zirconium sulfate-containing reaction liquid was cooled to an ordinary temperature, and 105 g of an aqueous cerium nitrate solution ($CeO_2$ basis: 20%), 8.5 g of an aqueous lanthanum nitrate solution (produced by Wako Pure Chemical Industries, Ltd.) ($La_2O_2$ basis: 20%), and 26.5 g of an aqueous neodymium nitrate solution ($Nd_2O_3$ basis: 20%) were added thereto and uniformly mixed.

The resulting liquid mixture was neutralized with a 25% aqueous sodium hydroxide solution to a pH of 13 or more to produce a hydroxide precipitate.

The obtained hydroxide precipitate was filtered and sufficiently washed with water. The resulting hydroxide was then dried at 105° C. for 24 hours, and the dried hydroxide was subjected to heat treatment at 600° C. in air for 5 hours to obtain a cerium oxide-containing zirconia-based porous body. This cerium oxide-containing zirconia-based porous body is called a "zirconia-based porous body before heat treatment."

Subsequently, the zirconia-based porous body before heat treatment was subjected to heat treatment at 1000° C. in air for 12 hours.

Separately, the zirconia-based porous body before heat treatment was subjected to heat treatment at 1100° C. in air for 12 hours, instead of the above heat treatment.

Table 1 shows the compositions of the zirconia-based porous body before heat treatment.

Table 2 shows the properties of the zirconia-based porous body before heat treatment, i.e., the P/W ratio in pore diameter distribution, specific surface area, total pore volume, OSC, particle diameter, particle circularity coefficient, average value of the number of the pores per unit area (1 $\mu m^2$), standard deviation of the number of pores, and variation coefficient of the number of pores.

Table 3 shows the P/W ratio, specific surface area, total pore volume, and OSC of the zirconia-based porous body after heat treatment at 1000° C. in air for 12 hours.

Table 4 shows the P/W ratio, specific surface area, total pore volume, and OSC of the zirconia-based porous body after heat treatment at 1100° C. in air for 12 hours.

Tables 1 to 4 also show the same for the zirconia-based porous bodies obtained in the following Examples and Comparative Examples.

Example 2

157 g of a 25% aqueous sodium sulfate solution and 331 g of an aqueous zirconium oxychloride solution ($ZrO_2$ basis: 16%) were separately heated to 97° C. Thereafter, the heated aqueous solutions were bought into contact and mixed with each other for a period of 3 hours in such a manner as to maintain the weight ratio of $SO_4^{2-}/ZrO_2$ in the liquid mixture to be 0.50, thereby obtaining a basic zirconium sulfate-containing reaction liquid. The obtained basic zirconium sulfate-containing reaction liquid was kept at 95° C. for 4 hours for aging to thereby obtain a basic zirconium sulfate.

Subsequently, the aged basic zirconium sulfate-containing reaction liquid was cooled to room temperature. Thereafter, 200 g of an aqueous cerium nitrate solution ($CeO_2$ basis: 20%) and 35 g of an aqueous lanthanum nitrate solution ($La_2O_3$ basis: 20%) were added thereto and uniformly mixed.

The resulting liquid mixture was neutralized with a 25% aqueous sodium hydroxide solution to a pH of 13 or more to produce a hydroxide precipitate.

The obtained hydroxide precipitate was filtered and sufficiently washed with water. The obtained hydroxide was then dried at 105° C. for 24 hours. The dried hydroxide was subjected to heat treatment at 600° C. in air for 5 hours to obtain a cerium oxide-containing zirconia-based porous body.

Subsequently, heat treatment was performed as in Example 1.

Example 3

266 g of a 25% aqueous sodium sulfate solution and 563 g of an aqueous zirconium oxychloride solution ($ZrO_2$ basis: 16%) were separately heated to 95° C. Thereafter, the heated aqueous solutions were bought into contact and mixed with each other for a period of 3 hours in such a manner as to maintain the weight ratio of $SO_4^{2-}/ZrO_2$ in the liquid mixture to be 0.50, thereby obtaining a basic zirconium sulfate-containing reaction liquid. The obtained basic zirconium sulfate-containing reaction liquid was kept at 96° C. for 4 hours for aging to thereby obtain a basic zirconium sulfate.

Subsequently, the aged basic zirconium sulfate-containing reaction liquid was cooled to an ordinary temperature. Thereafter, 45 g of an aqueous lanthanum nitrate solution ($La_2O_3$ basis: 20%) was added thereto and uniformly mixed.

The resulting liquid mixture was neutralized with 25% aqueous ammonia to a pH of 10 or more to produce a hydroxide precipitate.

The obtained hydroxide precipitate was filtered and sufficiently washed with water. The obtained hydroxide was then dried at 105° C. for 24 hours. The dried hydroxide was subjected to heat treatment at 500° C. in air for 5 hours to obtain a lanthanum oxide-containing zirconia-based porous body.

Subsequently, heat treatment was performed as in Example 1.

Example 4

252 g of a 25% aqueous sodium sulfate solution and 531 g of an aqueous zirconium oxychloride solution ($ZrO_2$ basis:

16%) were separately heated to 95° C. Thereafter, the heated aqueous solutions were bought into contact and mixed with each other for a period of 3 hours in such a manner as to maintain the weight ratio of $SO_4^{2-}/ZrO_2$ in the liquid mixture to be 0.50, thereby obtaining a basic zirconium sulfate-containing reaction liquid. The obtained basic zirconium sulfate-containing reaction liquid was kept at 95° C. for 4 hours for aging to thereby obtain a basic zirconium sulfate.

Subsequently, the aged basic zirconium sulfate-containing reaction liquid was cooled to an ordinary temperature. Thereafter, 75 g of an aqueous neodymium nitrate solution ($Nd_2O_3$ basis: 20%) was added thereto and uniformly mixed.

The resulting liquid mixture was neutralized with 25% aqueous ammonia to a pH of 10 or more to produce a hydroxide precipitate.

The obtained hydroxide precipitate was filtered and sufficiently washed with water. The obtained hydroxide was then dried at 105° C. for 24 hours. The dried hydroxide was subjected to heat treatment at 500° C. in air for 5 hours to obtain a neodymium oxide-containing zirconia-based porous body.

Subsequently, heat treatment was performed as in Example 1.

Comparative Example 1

213 g of a 25% aqueous sodium sulfate solution was heated to 85° C., to which 375 g of an aqueous zirconium oxychloride solution ($ZrO_2$ basis: 16%) previously heated to 75° C. was added. The resulting mixture was maintained for 0.5 hour to obtain an aged basic zirconium sulfate-containing reaction liquid.

Subsequently, the aged basic zirconium sulfate-containing reaction liquid was cooled to ordinary temperature. Then, 105 g of an aqueous cerium nitrate solution ($CeO_2$ basis: 20%), 8.5 g of an aqueous lanthanum nitrate solution ($La_2O_3$ basis: 20%), and 26.5 g of an aqueous neodymium nitrate solution ($Nd_2O_3$ basis: 20%) were added thereto and uniformly mixed.

The resulting liquid mixture was neutralized with a 25% aqueous sodium hydroxide solution to a pH of 13 or more to produce a hydroxide precipitate.

The obtained hydroxide precipitate was filtered and sufficiently washed with water. The resulting hydroxide was dried at 105° C. for 24 hours. The dried hydroxide was subjected to heat treatment at 600° C. in air for 5 hours to obtain a cerium oxide-containing zirconia-based porous body.

Subsequently, heat treatment was performed as in Example 1.

Comparative Example 2

After an aged basic zirconium sulfate-containing reaction liquid was obtained as in Comparative Example 1, the aged basic zirconium sulfate-containing reaction liquid was cooled to ordinary temperature. Then, 200 g of an aqueous cerium nitrate solution ($CeO_2$ basis: 20%) and 35 g of an aqueous lanthanum nitrate solution ($La_2O_3$ basis: 20%) were added thereto and uniformly mixed.

The resulting liquid mixture was neutralized with a 25% aqueous sodium hydroxide solution to a pH of 13 or more to produce a hydroxide precipitate.

The obtained hydroxide precipitate was filtered and sufficiently washed with water. The resulting hydroxide was dried at 105° C. for 24 hours. The dried hydroxide was subjected to heat treatment at 600° C. in air for 5 hours to obtain a cerium oxide-containing zirconia-based porous body.

Subsequently, heat treatment was performed as in Example 1.

TABLE 1

Composition Of Zirconia-Based Porous Body Before Heat Treatment

| Composition (%) | Ex. 1 | Ex. 2 | Ex. 3 | Ex. 4 | Comp. Ex. 1 | Comp. Ex. 2 |
|---|---|---|---|---|---|---|
| $ZrO_2$ | 72 | 53 | 90 | 85 | 72 | 53 |
| $CeO_2$ | 21 | 40 | — | — | 21 | 40 |
| $TiO_2$ | — | — | — | — | — | — |
| $Al_2O_3$ | — | — | — | — | — | — |
| $La_2O_3$ | 1.7 | 7 | 10 | — | 1.7 | 7 |
| $Nd_2O_3$ | 5.3 | — | — | 15 | 5.3 | — |
| Total | 100 | 100 | 100 | 100 | 100 | 100 |

TABLE 2

Properties Of Zirconia-Based Porous Body Before Heat Treatment

| | Ex. 1 | Ex. 2 | Ex. 3 | Ex. 4 | Comp. Ex. 1 | Comp. Ex. 2 |
|---|---|---|---|---|---|---|
| P/W ratio | 0.25 | 0.13 | 0.32 | 0.30 | 0.04 | 0.02 |
| Specific surface area (m²/g) | 62.9 | 65.3 | 70.2 | 68.6 | 72.1 | 66.1 |
| Total pore volume (cm³/g) | 0.69 | 0.62 | 0.81 | 0.75 | 0.68 | 0.54 |
| OSC (mmol/g) | 0.18 | 0.24 | — | — | 0.18 | 0.24 |
| Particle diameter (μm) | 5.7 | 6.4 | 5.2 | 5.3 | 1.5 | 2.1 |
| Particle circularity coefficient | 0.87 | 0.90 | 0.89 | 0.91 | 0.72 | 0.69 |
| Average value of the number of pores (pores) | 54.17 | 53.50 | 52.67 | 54.33 | 32.16 | 30.67 |
| Standard deviation of the number of pores | 3.06 | 3.50 | 2.80 | 3.78 | 5.85 | 3.88 |
| Variation coefficient of the number of pores | 5.65 | 6.56 | 5.33 | 6.95 | 18.17 | 12.66 |

TABLE 3

Properties Of Zirconia-Based Porous Body After Heat Treatment (after heat treatment in air at 1000° C. for 12 hours)

| | Ex. 1 | Ex. 2 | Ex. 3 | Ex. 4 | Comp. Ex. 1 | Cmp. Ex. 2 |
|---|---|---|---|---|---|---|
| P/W ratio | 0.08 | 0.06 | 0.11 | 0.09 | 0.02 | 0.01 |
| Specific surface area (m²/g) | 54.0 | 48.2 | 49.7 | 46.4 | 54.2 | 46.3 |
| Total pore volume (cm³/g) | 0.55 | 0.53 | 0.54 | 0.50 | 0.56 | 0.48 |
| OSC (mmol/g) | 0.16 | 0.23 | — | — | 0.15 | 0.20 |

TABLE 4

Properties Of Zirconia-Based Porous Body After Heat Treatment
(after heat treatment in air at 1100° C. for 12 hours)

|  | Ex. 1 | Ex. 2 | Ex. 3 | Ex. 4 | Comp. Ex. 1 | C.amp. Ex. 2 |
|---|---|---|---|---|---|---|
| Specific surface area ($m^2/g$) | 25.8 | 26.5 | 23.3 | 23.9 | 20.9 | 21.6 |
| OSC (mmol/g) | 0.14 | 0.21 | — | — | 0.14 | 0.21 |

INDUSTRIAL APPLICABILITY

The zirconia-based porous body of the present invention achieves an effect of purifying toxic components in exhaust gas, when used for a catalyst for purifying various types of exhaust gas, a three-way catalyst (TWC), or the like. The zirconia-based porous body of the present invention can be used for widely varying exhaust gas purification catalysts, such as exhaust gas oxidation catalysts, NOx storage/purification catalysts, and NOx selective reduction catalysts, all of which are for internal combustion engines, in an environment where its oxygen storage ability and oxygen release ability can be effectively used. The zirconia-based porous body of the present invention can also be used for grinding materials, electric/electronic materials and the like, in which its oxygen storage ability and oxygen release ability can be effectively used.

EXPLANATION OF REFERENCE NUMERALS

A1: Pore volume distribution
A2: Pore diameter peak P in the pore diameter distribution by the BJH method
A3: Half width W of the peak in the measured pore diameter distribution curve

The invention claimed is:

1. A zirconia-based porous body in the form of particles,
(1) the zirconia-based porous body having a pore diameter peak at 20 to 100 nm in the pore diameter distribution by BJH method, a P/W ratio of 0.05 or more wherein W represents half width of the peak and P represents height of the peak in the measured pore distribution curve, and a total pore volume of 0.5 $cm^3/g$ or more; and
(2) the zirconia-based porous body having a pore diameter peak at 20 to 100 nm, the P/W ratio of 0.03 or more, a specific surface area of at least 40 $m^2/g$, and a total pore volume of 0.3 $cm^3/g$ or more, after heat treatment at 1000° C. for 12 hours.

2. The zirconia-based porous body according to claim 1, wherein the zirconia-based porous body has a specific surface area of at least 20 $m^2/g$ after heat treatment at 1100° C. for 12 hours.

3. The zirconia-based porous body according to claim 1, wherein each of the particles is spherical or approximately spherical as identified in an SEM image, and has a circularity coefficient of 0.85 to 1.0.

4. A method for producing a zirconia-based porous body, the method sequentially comprising the following steps:

(1) separately heating a zirconium salt solution and a solution of sulfatizing agent to 95° C. or higher;
(2) contacting and mixing the zirconium salt solution after heating and the solution of sulfatizing agent after heating to obtain a basic zirconium sulfate-containing reaction liquid as a liquid mixture, wherein, from initiation to completion of the mixing, the weight ratio of $SO_4^{2-}/ZrO_2$ in the liquid mixture is maintained within a range of 0.3 to 0.8, and the temperature of the liquid mixture is maintained at 95° C. or higher;
(3) aging the basic zirconium sulfate-containing reaction liquid obtained by completing the mixing in step 2, the aging being performed at 95° C. or higher for 3 hours or more;
(4) adding an alkali to the basic zirconium sulfate-containing reaction liquid obtained after aging in step 3 to obtain a zirconium-containing hydroxide; and
(5) subjecting the zirconium-containing hydroxide obtained in step 4 to heat treatment to obtain a zirconia-based porous body,
wherein the zirconia-based porous body in the form of particles,
(i) the zirconia-based porous body having a pore diameter peak at 20 to 100 nm in the pore diameter distribution by BJH method, a P/W ratio of 0.05 or more wherein W represents half width of the peak and P represents height of the peak in the measured pore distribution curve, and a total pore volume of 0.5 $cm^3/g$ or more; and
(ii) the zirconia-based porous body having a pore diameter peak at 20 to 100 nm, the P/W ratio of 0.03 or more, a specific surface area of at least 40 $m^2/g$, and a total pore volume of 0.3 $cm^3/g$ or more, after heat treatment at 1000° C. for 12 hours.

5. The zirconia-based porous body production method according to claim 4, the method comprising adding a salt of at least one metal selected from the group consisting of rare earth elements, transition metal elements other than rare earth elements, alkali earth metal elements, Al, In, Si, Sn, and Bi, in any one of steps 1 to 4.

6. The zirconia-based porous body according to claim 2, wherein each of the particles is spherical or approximately spherical as identified in an SEM image, and has a circularity coefficient of 0.85 to 1.0.

7. The method for producing a zirconia-based porous body according to claim 4, wherein the zirconia-based porous body has a specific surface area of at least 20 $m^2/g$ after heat treatment at 1100° C. for 12 hours.

8. The method for producing a zirconia-based porous body according to claim 4, wherein each of the particles is spherical or approximately spherical as identified in an SEM image, and has a circularity coefficient of 0.85 to 1.0.

9. The method for producing a zirconia-based porous body according to claim 4, wherein the weight ratio of $SO_4^{2-}/ZrO_2$ in the liquid mixture is maintained at a specific value within a range of 0.3 to 0.8 in step (2).

10. The zirconia-based porous body according to claim 1, further including at least one metal selected from the group consisting of rare earth elements, transition metal elements other than rare earth elements, alkali earth metal elements, Al, In, Si, Sn, and Bi.

* * * * *